(12) United States Patent
Grzesik et al.

(10) Patent No.: US 6,993,936 B2
(45) Date of Patent: Feb. 7, 2006

(54) SYSTEM AND METHOD FOR SUPPRESSING THE FORMATION OF OXYGEN INCLUSIONS AND SURFACE BLISTERS IN GLASS SHEETS AND THE RESULTING GLASS SHEETS

(75) Inventors: Paul R. Grzesik, Corning, NY (US); Thomas D. Ketcham, Big Flats, NY (US); David M. Lineman, Painted Post, NY (US); Randy D. Ziegenhagen, Elmira, NY (US)

(73) Assignee: Corning Incorporated, Corning, NY (US)

( * ) Notice: Subject to any disclaimer, the term of this patent is extended or adjusted under 35 U.S.C. 154(b) by 152 days.

(21) Appl. No.: 10/656,685

(22) Filed: Sep. 4, 2003

(65) Prior Publication Data

US 2005/0050923 A1    Mar. 10, 2005

(51) Int. Cl.
*C03B 5/42* (2006.01)

(52) U.S. Cl. .................. 65/134.9; 65/53; 65/135.1; 65/195; 65/374.11; 65/374.12

(58) Field of Classification Search .............. 65/53, 65/134.9, 135.1, 195, 374.11, 374.12
See application file for complete search history.

(56) References Cited

U.S. PATENT DOCUMENTS

| | | | |
|---|---|---|---|
| 3,338,696 A | 8/1967 | Dockerty | 65/145 |
| 3,607,184 A * | 9/1971 | Williams | 65/83 |
| 3,682,609 A | 8/1972 | Dockerty | 65/83 |
| 3,870,497 A | 3/1975 | Spiessens | 65/32 |
| 4,983,198 A | 1/1991 | Ogino | 65/32.5 |
| 5,612,892 A | 3/1997 | Almulla | 364/489 |
| 5,785,726 A | 7/1998 | Dorfeld et al. | 65/134.1 |
| 5,824,127 A | 10/1998 | Bange et al. | 65/90 |
| 6,128,924 A | 10/2000 | Bange et al. | 65/90 |
| 6,250,111 B1 * | 6/2001 | Murakami et al. | 65/134.9 |
| 6,508,083 B1 | 1/2003 | Naka et al. | 65/134.3 |
| 6,629,437 B1 | 10/2003 | Baucke et al. | 65/134.9 |
| 6,769,272 B2 | 8/2004 | Roeth et al. | 65/134.9 |
| 2004/0177649 A1 | 9/2004 | Dorfeld et al. | 65/90 |

* cited by examiner

*Primary Examiner*—Sean E Vincent
(74) *Attorney, Agent, or Firm*—William J. Tucker, Esq.; Thomas R. Beall

(57) ABSTRACT

A system and method for suppressing the formation of gaseous inclusions in glass sheets and the resulting glass sheets are described herein. The system includes a melting, fining, delivery, mixing or forming vessel that has a refractory metal component (e.g., platinum component) which has an inner wall that contacts molten glass and an outer wall coated with an oxygen ion transportable material (e.g., zirconia) which is coated with a conductive electrode. The system also includes a DC power source that supplies DC power across the oxygen ion transportable material which causes oxygen ions to migrate from the refractory metal component to the conductive electrode and enables one to control the partial pressure of oxygen around an exterior of the vessel which helps one to effectively prevent hydrogen permeation from the molten glass in order to suppress the formation of undesirable gaseous inclusions and surface blisters within the glass sheet. The present invention also helps one to effectively reduce the oxidation of external, non-glass contact surfaces of the refractory metal component.

16 Claims, 5 Drawing Sheets

SYSTEM AND METHOD FOR SUPPRESSING THE FORMATION OF OXYGEN INCLUSIONS AND SURFACE BLISTERS IN GLASS SHEETS AND THE RESULTING GLASS SHEETS

BACKGROUND OF THE INVENTION

1. Field of the Invention

The present invention relates to a system and method for suppressing the formation of oxygen inclusions and surface blisters in glass sheets and the resulting glass sheets.

2. Description of Related Art

Liquid crystal displays (LCDs) are flat panel display devices that include flat glass substrates or sheets. The fusion process is a preferred technique for producing sheets of glass used in LCDs because the fusion process produces sheets whose surfaces have superior flatness and smoothness compared to sheets produced by other methods. The fusion process is described in U.S. Pat. Nos. 3,338,696 and 3,682,609, the contents of which are incorporated herein by reference.

Many of the glass sheets manufactured for flat panel display applications, particularly those formed by the fusion process (also referred to as the downdraw process or the slot draw process), are melted and formed with components made from refractory metals, e.g. platinum or platinum alloys. This is particularly true in the fining and conditioning sections of the fusion process, where refractory metals are employed to minimize the creation of gaseous inclusions within the glass sheets. To further minimize the creation of gaseous inclusions within the glass sheets, the fusion process often employs arsenic as a fining agent. Arsenic is among the highest temperature fining agents known, and, when added to the molten glass bath, it allows for $O_2$ release from the glass melt at high melting temperatures (e.g., above 1450° C.). This high temperature $O_2$ release, which aids in the removal of bubbles during the melting and fining stages of glass production, coupled with a strong tendency for $O_2$ absorption at lower conditioning temperatures (which aids in the collapse of any residual gaseous inclusions in the glass), results in a glass sheet that is essentially free of gaseous inclusions. From an environmental point of view, it would be desirable to provide alternative methods of making such high melting point and strain point glass sheets without having to employ arsenic as a fining agent.

It would also be desirable to find alternative methods for making such glass sheets via the downdraw process in which the glass sheets have very little if any gaseous inclusions or surface blistering. One such method is described in U.S. Pat. No. 5,785,726 which discloses a humidity controlled enclosure that surrounds all or a portion of a platinum-containing vessel and is used to control the dew point outside the vessel in order to reduce the formation of gaseous inclusions in glass sheets. Another method for reducing the formation of gaseous inclusions in glass sheets is described in U.S. Pat. Nos. 6,128,924 and 5,824,127 which disclose the use of various batch constituents to minimize the water content in the glass composition and thus the hydrogen concentration on the inside surface of the platinum-containing vessel. Although the methods disclosed in the patents mentioned above successfully reduce the formation of gaseous inclusions in glass sheets formed in systems utilizing platinum-containing vessels, it would be desirable to provide alternative methods to prevent the formation of gaseous inclusions in glass sheets.

BRIEF DESCRIPTION OF THE INVENTION

The present invention includes an alternative system and method for suppressing the formation of gaseous inclusions in a glass sheets and the resulting glass sheets. The system includes a melting, fining, delivery, mixing or forming vessel that has a refractory metal component (e.g., platinum component) which has an inner wall that contacts molten glass and an outer wall coated with an oxygen ion transportable material (e.g., partially or fully stabilized zirconia) which is coated with a conductive electrode. The system also includes a DC power source that supplies DC power across the oxygen ion transportable material which causes oxygen ions to migrate from the refractory metal component to the conductive electrode and enables one to control the partial pressure of oxygen around an exterior of the vessel which helps one to effectively prevent hydrogen permeation from the molten glass in order to suppress the formation of undesirable gaseous inclusions and surface blisters within the glass sheet.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
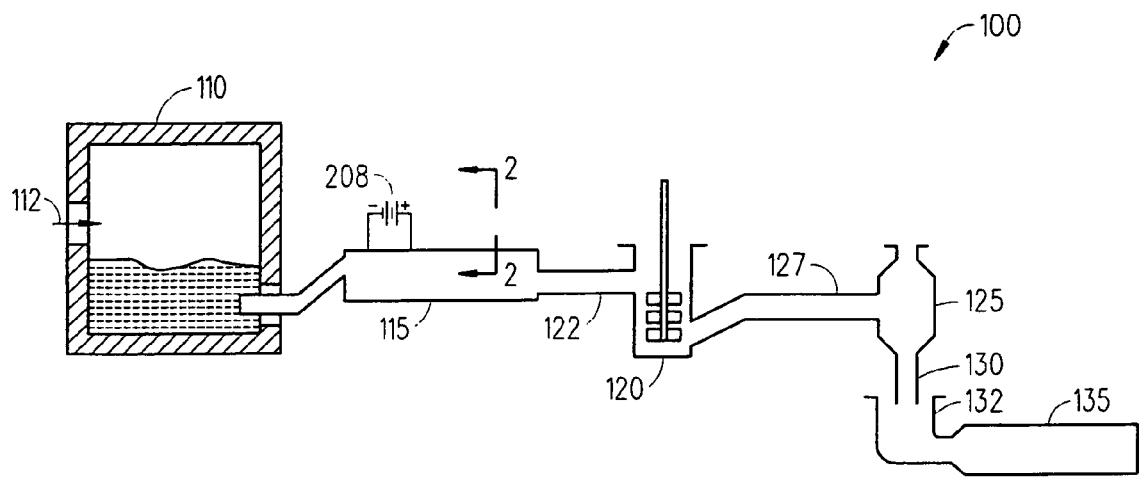
FIG. 1 is a block diagram illustrating an exemplary system in accordance with a first embodiment of the present invention.

Before describing exemplary embodiments of the present invention, it should be understood that the present invention is not limited to the details of construction or process steps set forth in the following description. In fact, the present invention is capable of other embodiments and of being practiced or carried out in various ways.

The present invention is directed to a method of forming glass sheets in a manufacturing system which employs at least one vessel that contains a refractory metal component (e.g., platinum-containing component). The preferred glass sheets are aluminosilicate glass sheets or borosilicate glass sheets. And, the preferred process for manufacturing these glass sheets is the downdraw sheet manufacturing process. As used herein, the downdraw sheet manufacturing process refers to any form of glass sheet manufacturing process in which glass sheets are formed while traveling in a downward direction. In the fusion or overflow downdraw forming process, molten glass flows into a trough, then overflows and runs down both sides of a pipe, fusing together at what is known as the root (where the pipe ends and the two overflow walls of glass rejoin), and is drawn downward until cool. The overflow downdraw sheet manufacturing process is described in U.S. Pat. No. 3,338,696 (Dockerty) and U.S. Pat. No. 3,682,609 (Dockerty) both of which are hereby incorporated by reference herein. This technique is capable of forming very flat and thin glass sheets.

Other forms of downdraw sheet forming techniques include the slot draw and redraw forming techniques. In the slot draw technique, molten glass flows into a trough having a machined slot in the bottom. The sheets of glass are pulled down through the slot. The quality of the glass sheets is dependent on the accuracy of the machined slot. The redraw forming technique generally involves preforming a glass composition into a block of some shape, then reheating and drawing the glass downwardly into a thinner sheet product.

All of these manufacturing techniques in which silicate glass is melted and formed into glass sheets utilize one or more vessels that have a glass contacting material which contains a refractory metal such as platinum because of its inert properties. Unfortunately, platinum enables hydrogen migration to occur from the glass melt through the platinum, thereby creating an oxygen rich layer at the glass/platinum interface which can lead to the formation of undesirable gaseous oxygen inclusions or surface blisters in the glass.

While not wishing to be bound by theory, it is believed that the surface blistering effect which occurs in platinum vessels, for example, occurs as a result of the formation of an oxygen rich layer near the platinum-glass melt interface. This oxygen rich layer in the glass is believed to be produced by a combination of thermoelectric electrolysis of the glass melt, breakdown of oxide fining agents, and the number of OH groups dissolved in the glass. The latter effect is believed to have a large impact on the rate of blistering as a result of the contact of the glass with the platinum. It is also believed that OH groups dissociate into neutral hydrogen and oxygen. The hydrogen then permeates the platinum skin, enriching the surface region (platinum contacting region) of the glass with oxygen which can then form bubbles in the glass if the solubility limit of the glass is exceeded. In particular, the hydrogen permeation blistering occurs due to the loss of hydrogen from the glass when the partial pressure of hydrogen at the glass/platinum interface is higher than the partial pressure of hydrogen at the external surface of the platinum vessels (see FIG. 5A). The present invention helps reduce the undesirable bubble generation by controlling reactions that occur at the boundary layer between the platinum skin and glass. An exemplary glass delivery system 100 in accordance with the present invention is described below with respect to FIGS. 1–6.

Referring to FIG. 1, there is shown a schematic view of the system 100 for making glass sheets using the downdraw fusion process. The system 100 includes a melting vessel 110 into which batch materials are introduced as shown by arrow 112, and initial glass melting occurs in the melting vessel 110. The melting vessel 110 is made from refractory materials. The system 100 further includes components that are typically made from platinum or platinum-containing metals. For example, platinum-containing metals include alloys of platinum, which may include Pt—Rh, Pt—Ir, etc, and combinations thereof. The platinum-containing components include a fining vessel 115 (e.g., finer tube 115), a mixing vessel 120 (e.g., stir chamber 120), a finer to stir chamber connecting tube 122, a delivery vessel 125 (e.g., bowl 125), a stir chamber to bowl connecting tube 127, a downcomer 130, an inlet 132 and a forming vessel 135 (e.g., fusion pipe 135). The fining vessel 115 is a high temperature processing area for removing bubbles. The delivery vessel 125 delivers the glass through the downcomer 130 to the inlet 132 and into the forming vessel 135 which forms a glass sheet.

Figure 2:
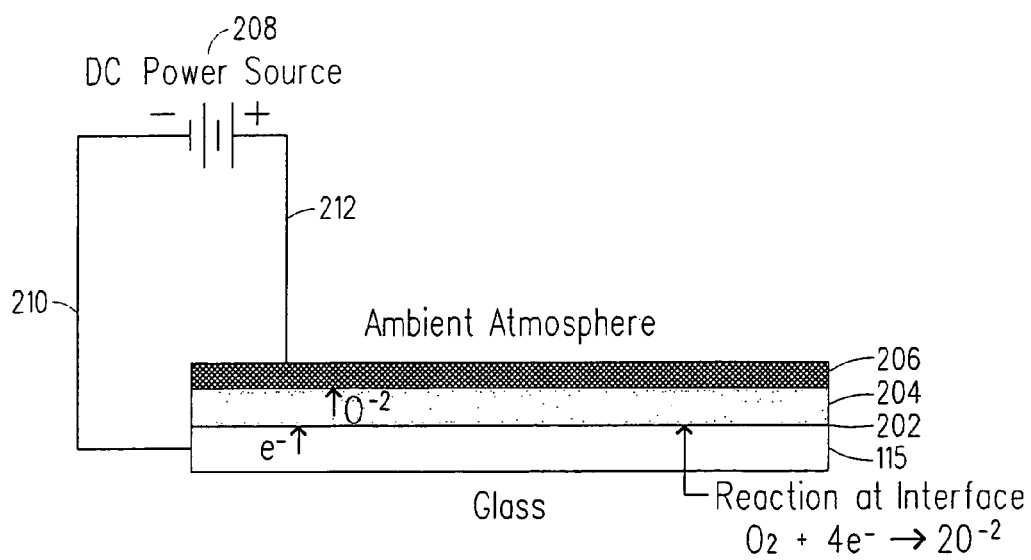
FIG. 2 is a partial cross sectional side view of one of the vessels used within the system shown in FIG. 1.
Figure 3:
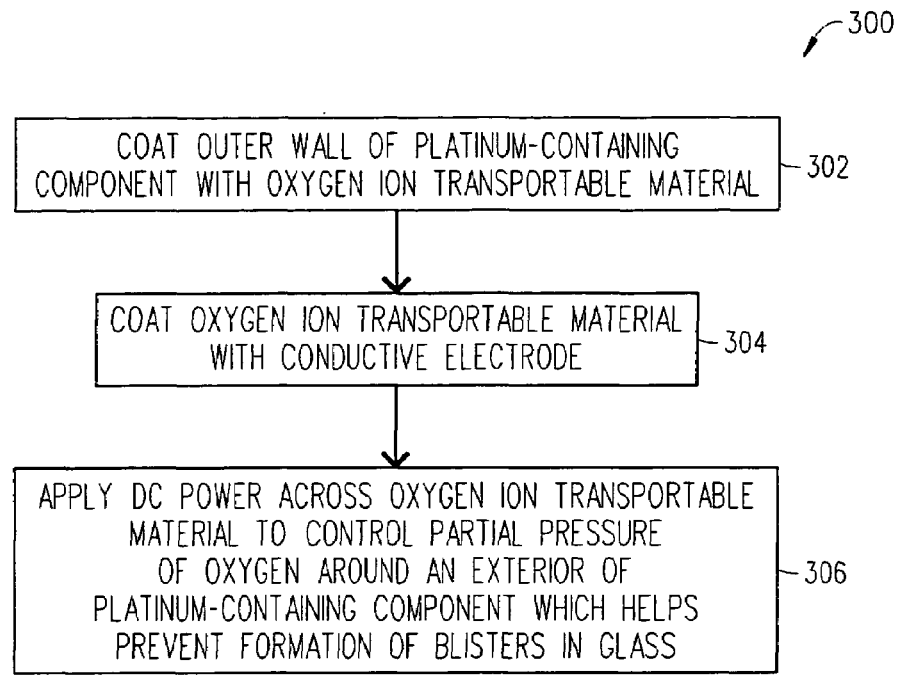
FIG. 3 is a flowchart illustrating the basic steps in a method for suppressing the formation of oxygen inclusions and surface blisters in glass sheets in accordance with the present invention.

Referring to FIGS. 2 and 3, there are shown a partial cross sectional side view of one of the vessels 115 (for example) in the system 100 and a flowchart illustrating the steps in a method 300 for forming a glass sheet utilizing the system 100. According to a preferred embodiment of the invention, the platinum containing component 115, 120, 122, 125, 127, 130 and 132 that is in contact with molten glass has an outer wall 202 coated (step 302) with an oxygen ion transportable material 204 (e.g., zirconia 204) which is then coated (step 304) with a conductive electrode 206. A DC power source 208 supplies (step 306) DC power across the zirconia 204 which causes oxygen ions to migrate from the platinum containing component 115, 120, 122, 125, 127, 130 and 132 to the conductive electrode 206 and enables one to control the partial pressure of oxygen around an exterior of the platinum containing component 115, 120, 122, 125, 127, 130 and 132 which helps to prevent hydrogen permeation from the glass which causes oxygen rich blisters to form in the glass. As shown, the DC power source 208 has a negative power lead 210 connected to the platinum containing component 115, 120, 122, 125, 127, 130 and 132 and a positive power lead 212 connected to the conductive electrode 206.

By applying the appropriate DC voltage with the appropriate polarity across the zirconia 204, oxygen ions ($O^{-2}$) migrate from the inside surface of the zirconia 204 to the outside surface of the zirconia 204 (see exploded view in FIG. 2). One molecule of oxygen gas is removed from the surface of the platinum containing component 115, 120, 122, 125, 127, 130 and 132 for every two molecules of oxygen ions that migrate through the zirconia 204. This is due to the electron ($e^-$) flow established by the DC power supply 208. As oxygen ions ($O^{-2}$) leave the interface between the external surface of the platinum containing component 115, 120, 122, 125, 127, 130 and 132 and the zirconia 204, the partial pressure of oxygen is reduced around the external surface of the platinum containing components 115, 120, 122, 125, 127, 130 and 132. The rate of removal of the oxygen from the external surface of the platinum containing components 115, 120, 122, 125, 127, 130 and 132 is proportional to the current flow from the DC power source 208 as related by faraday's law. For example one can use the DC power source 208 to vary the voltage and current applied to the zirconia 204 in order to control the magnitude of the partial pressure of oxygen so it is within the range of 1 to $10^{-10}$ atmospheres which enables one to tailor the magnitude of the partial pressure of hydrogen to any level required to prevent hydrogen permeation.

Two favorable reactions occur as the partial pressure of hydrogen is raised and the partial pressure of oxygen is lowered on the external surface of the platinum containing component 115, 120, 122, 125, 127, 130 and 132. First, the rate of hydrogen permeation from the glass is reduced due to a shift in the water, hydrogen and oxygen equilibrium at the external surface of the platinum containing component 115, 120, 122, 125, 127, 130 and 132. This reduction of hydrogen permeation from the glass helps suppress the formation of oxygen blisters in the glass (see FIG. 5B). Secondly, the rate of oxidation of the platinum containing component 115, 120, 122, 125, 127, 130 and 132 is reduced due to the lower availability of oxygen for the oxidation reaction.

Figure 4:
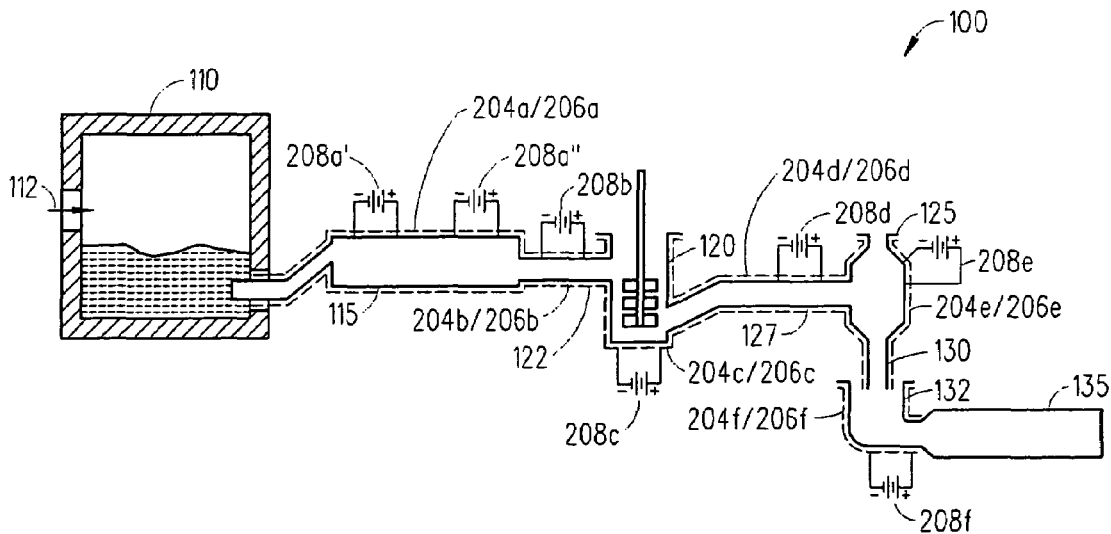
FIG. 4 is a block diagram illustrating an exemplary system in accordance with a second embodiment of the present invention.

Referring to FIG. 4, there is shown a schematic view of a system 100' in accordance with a second embodiment of the present invention. As shown, the system 100' includes discrete sections of oxygen ion transportable material 204a . . . 204f (e.g., zirconia 204a . . . 204f), discrete conductive electrodes 206a . . . 206f and discrete DC power sources 208a . . . 206f that enable one to control the hydrogen permeation at individual sections of the system 100'. It should also be appreciated that the individual sections of the system 100' may be connected to more than one power supply 208. For example as shown, the fining vessel 115 can have more than one power supply 208a' and 208a" (two shown). Alternatively, the system 100' can be covered with the oxygen ion transportable material 204 (e.g., zirconia 204) and then covered with discrete conductive electrodes 206a . . . 206f and discrete DC power sources 208a . . . 208f that enable one to control the hydrogen permeation at individual sections of the system 100' (not shown).

Figure 5A:
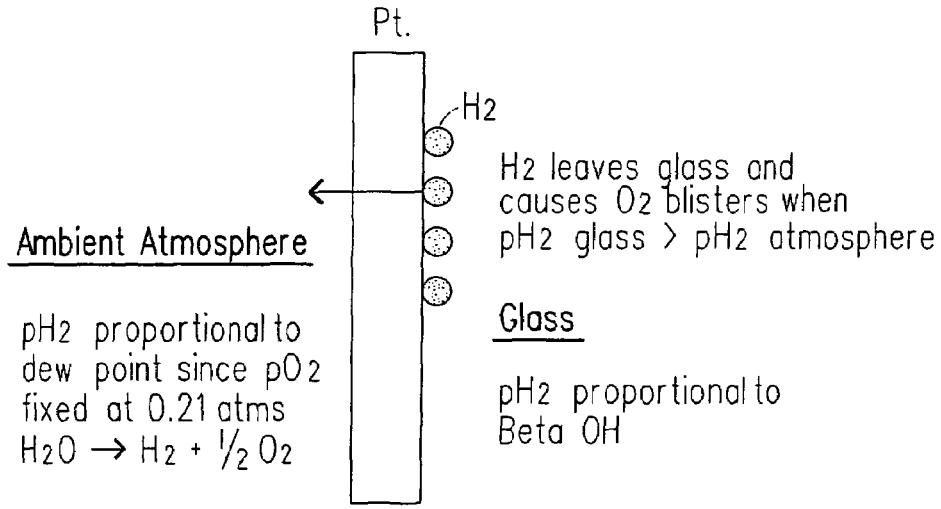
FIG. 5A (prior art) is a schematic that illustrates the hydrogen permeation reaction that occurs without the oxygen extraction technology of the present invention.
Figure 5B:
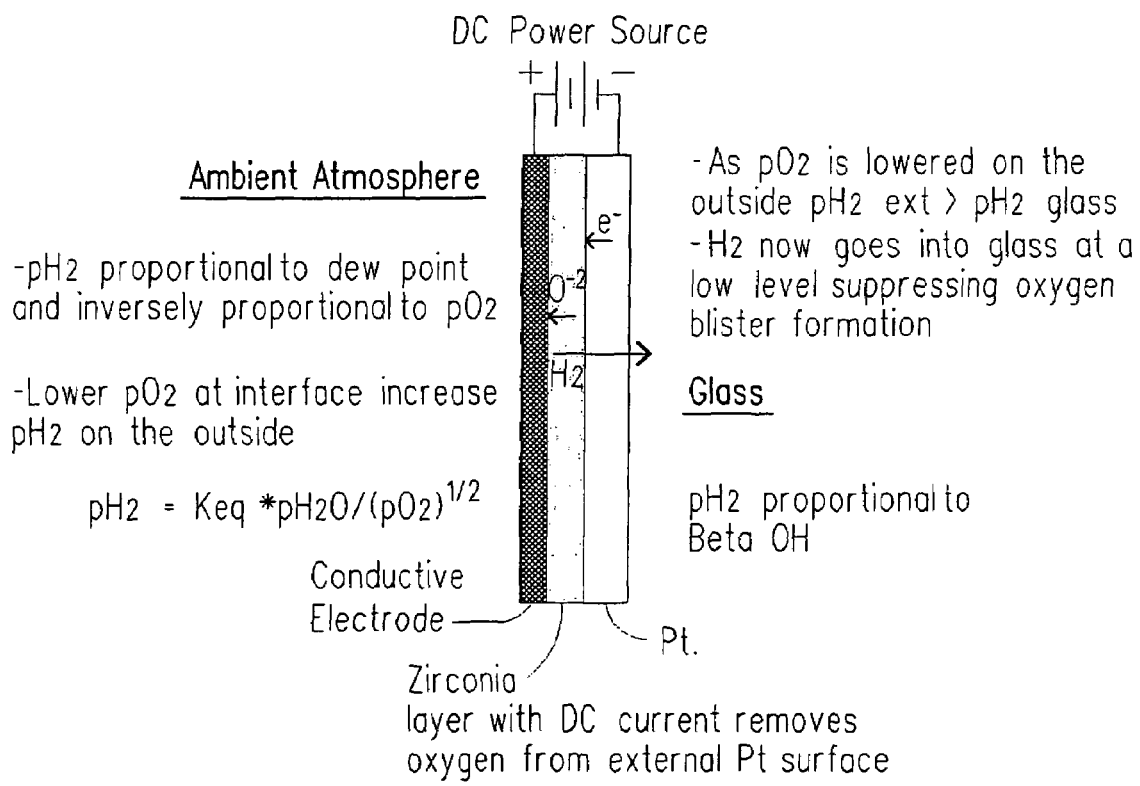
FIG. 5B is a schematic that illustrates the hydrogen permeation reaction that occurs with the oxygen extraction technology of the present invention.

The impact of the present invention on hydrogen permeation can be demonstrated based on thermodynamics. At a given temperature, equilibrium exists between water, hydrogen and oxygen according to the reaction $H_2O \rightarrow H_2 + \frac{1}{2}O_2$. The constant for this equilibrium, at a set temperature, can be expressed as $K_{eq}=[(pH_2)*(pO_2)^{1/2}]/pH_2O$. Based on this equilibrium, it is evident that in the past the partial pressure of hydrogen, on the external surface of a platinum containing component is determined by the partial pressure of water (e.g., the dew point) because the partial pressure of oxygen in air is fixed at 0.21 atmospheres for air. Until the present invention, the only way to increase the partial pressure of hydrogen at the external surface of the precious metal, and thereby reduce the blister generation in the glass due to hydrogen permeation, was to use a humidity control enclosure to increase the dew point of the atmosphere around the system (see U.S. Pat. No. 5,785,726). However as described above, the present invention effectively reduces the partial pressure of oxygen at the external surface of the platinum containing component 115, 120, 122, 125, 127, 130 and 132 which in turn increases the partial pressure of hydrogen at the external surface of the platinum containing component 115, 120, 122, 125, 127, 130 and 132 which reduces the blister generation in the glass due to hydrogen permeation (see FIG. 5B). And, this can all be done by the present invention without having to use a humidity control enclosure to change the dew point around the system 100 and 100'. As such with the present invention, even at the lowest dew point atmosphere of winter, it is possible to obtain a partial pressure of hydrogen on the external surface of the platinum containing component 115, 120, 122, 125, 127, 130 and 132 that exceeds that of a 100° F. dew point day. FIGS. 5A and 5B are schematics that illustrate the hydrogen permeation reactions that occur without and with the oxygen extraction technology of the present invention.

It should be appreciated that a majority of the hydrogen in the system 100 and 100' is generated because of the thermal breakdown of water at the elevated temperatures encountered in the melting vessel 110. The water in the glass comes from chemically bound moisture in the glass and is proportional to the beta-OH of the glass. In addition, there is water at the external surface of the system 100 and 100' which comes from moisture in the air and is proportional to the dew point of the air. The water at the external surface of the system 100 and 100' also thermally breaks down into hydrogen and oxygen at the elevated temperatures of operation.

It should also be appreciated that the partial pressure of hydrogen, under a given set of conditions, can be calculated based on the Gibbs free energy for the reaction, $H_2O \rightarrow H_2 + \frac{1}{2}O_2$. For example, the free energy (G) for the water reaction is G=58,900−13.1 T. Where T is the temperature in degrees Kelvin and G is the free energy in calories per mole. At a given temperature, the equilibrium constant for the water reaction can be calculated using the relationship $K_{eq}=e^{-G/RT}$, where G and T are as previously noted and R is the gas constant. Once $K_{eq}$ is known, the ratio of the partial pressures of the various gases involved in the water breakdown can be calculated where $K_{eq}=[(pH_2)*(pO_2)^{1/2}]/[pH_2O]$. For example, at 1450° C., $K_{eq}$ is equal to $2.47 \times 10^{-5}$. If a 75° F. dew point air environment (pH$_2$O of 0.030 atmospheres and pO$_2$ of 0.21 atmospheres) is heated to 1450° C., pH$_2$ is calculated to be $1.59 \times 10^{-6}$ atmospheres (1.59 ppm). And, if the partial pressure of hydrogen (1.59 ppm) is greater than the partial pressure of hydrogen present at the glass/platinum interface then hydrogen permeation blistering is suppressed.

Using the same equilibrium calculation, one can see that a decrease in the partial pressure of oxygen will increase the partial pressure of hydrogen, at a constant partial pressure of water (dew point). The present invention takes advantage of this property and enables one to lower the partial pressure of oxygen at the glass/platinum interface which causes the partial pressure of hydrogen on the exterior of the system 100 and 100' to be greater than the partial pressure of hydrogen in the glass. As such, hydrogen now goes into the glass at a low level which effectively suppresses the formation of oxygen blisters in the glass (see FIG. 5B).

Figure 6:
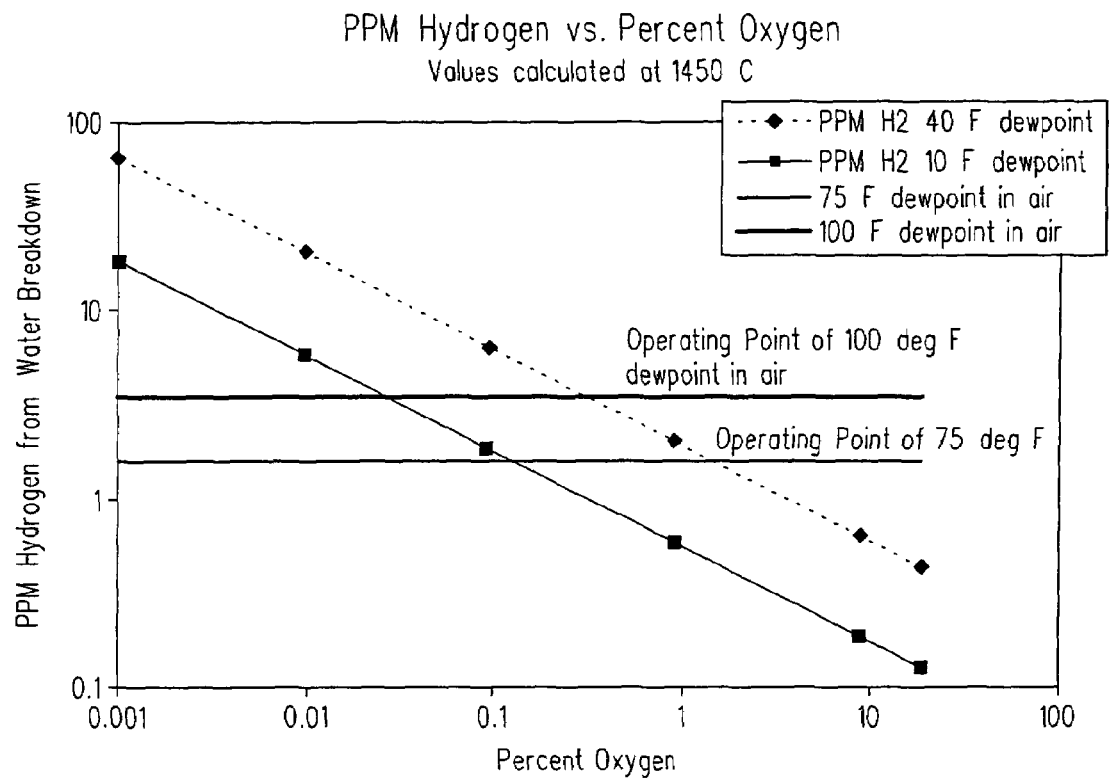
FIG. 6 is a graph that illustrates the impact of the oxygen level on the partial pressure of hydrogen around the external surface of the systems shown in FIGS. 1 and 4.

In fact, calculations indicate that an atmosphere that has a dew point of 10° F. can be made by the present invention to have a partial pressure of hydrogen higher than a 100° F. dew point air atmosphere. FIG. 6 shows a graph that illustrates this concept. In the graph, the partial pressure of hydrogen is shown for a 10° F. and 40° F. dew point atmosphere as a function of oxygen level. For reference, lines indicating the partial pressure of hydrogen for a 75° F. and 100° F. dew point air atmosphere are shown. This data indicates that the 10° F. dew point atmosphere will have a partial pressure of hydrogen greater than the 100° F. dew point air, if its partial pressure of oxygen is less than 0.01 percent.

Figure 7:
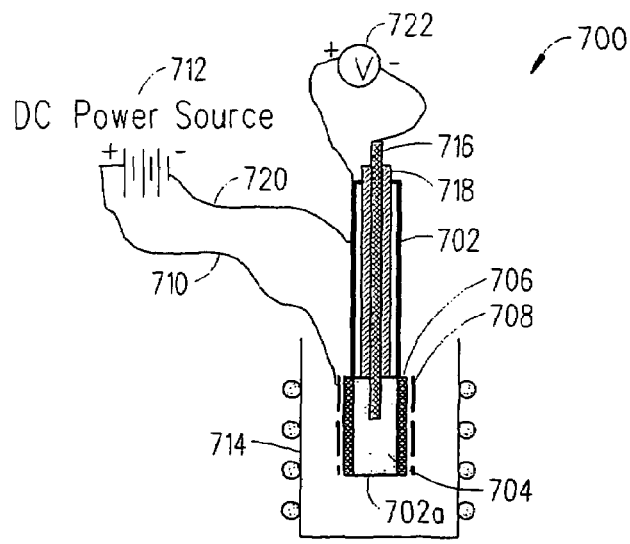
FIG. 7 is a diagram of an experimental set-up used to verify the oxygen extraction technology of the present invention.

Referring to FIG. 7, there is shown an experimental set-up 700 used to verify the oxygen extraction technology of the present invention. The experimental set-up 700 included a 0.435 inch diameter by 12 inch long tube of Pt-20Rh 702 that was closed on one end 702a to be able to hold Corning Code 1737G glass 704. A three inch section of the tube 702, near the closed end 702a, was plasma sprayed with a 0.010" thick layer of Ca stabilized zirconia 706. On the external surface of the zirconia 706, a Pt electrode 708 was made by painting a paste containing Pt powder in a ring pattern around the circumference of the zirconia 706. Care was taken to make sure that the Pt electrode 708 was electrically isolated from the 0.435" diameter Pt-20Rh tube 702. The purpose of the Pt electrode 708 was to allow electrical contact to the external surface of the zirconia 706. Any other conductive material could have been used to make this electrode 708. The tube 702 with the Pt electrode 708 on the external surface of the zirconia 706 was then fired at 1400° C. for 1 hour to sinter the Pt together and drive off the organic binder. After firing, the Pt electrode 708 made an electrically conductive surface over about 30% of the external surface of the zirconia 706. The glass 704 was then placed inside the tube 702 to a level equivalent to the height of the zirconia 706. A Pt lead wire 710 was wrapped around the Pt electrode 708 on the external surface of the zirconia 706 to allow for a positive electrical connection to a DC power source 712. The bottom 6 inches of the tube 702 was then suspended into a 1450° C. furnace 714. This caused the glass 704 inside the tube 702 to melt. A ⅛" diameter Pt rod 716 was inserted inside the Pt tube 702 to the point where the tip of the rod 716 was immersed in the molten glass 704 about M inch. The portion of this rod 716 above the glass 704 was sheathed with an alumina sleeve 718 to prevent the rod 716 from electrically contacting the inside surface of the Pt tube 702. A Pt lead wire 720 was connected to the Pt tube 702 to allow for a negative electrical connection to the DC power source 712. The DC potential between the rod 716 and tube 702 was monitored using a voltage monitor 722. The measured DC potential was indicative of the partial pressure of oxygen at the two Pt/glass interfaces. It was assumed that the partial pressure of oxygen at the interface of the Pt rod 716 and glass 704 is close to being equilibrated with air. And, an estimate of the partial pressure of oxygen at the interface of the Pt tube 702 and glass 704 can be made using the Nernst equation. This data, with the conversion of potential to partial pressure of oxygen is provided in the graph shown in FIG. 8.

Figure 8:
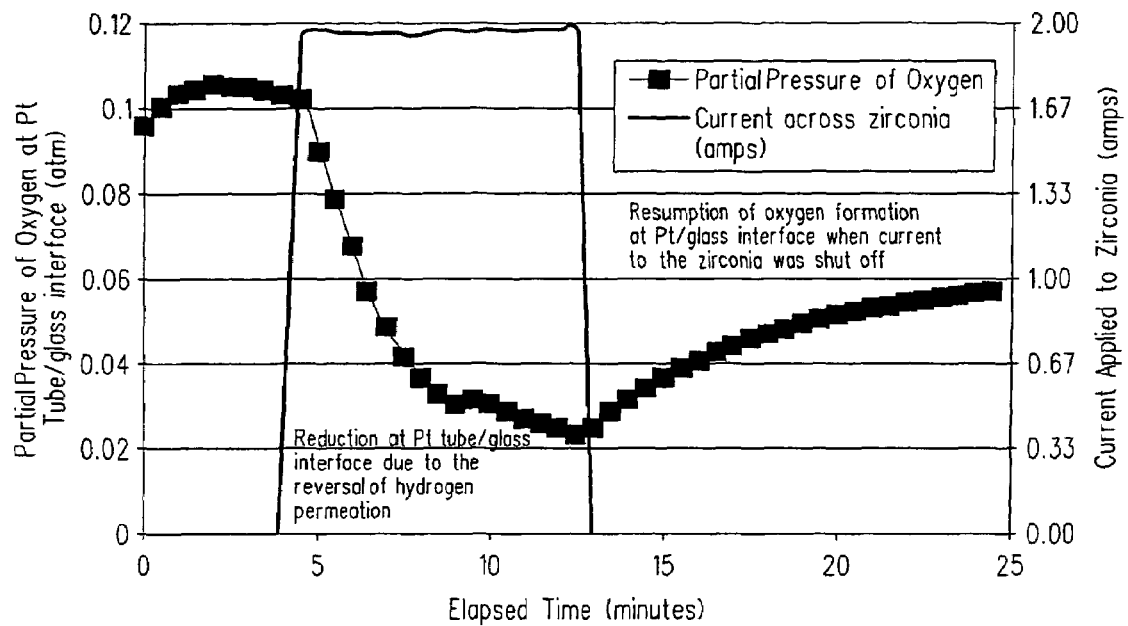
FIG. 8 is a graph that illustrates data which shows a decrease in partial pressure of oxygen at an interface of a Pt tube and glass when current is applied across a zirconia layer in the experimental set-up shown in FIG. 7.

Referring to the graph shown in FIG. 8, it is apparent that extracting oxygen from the external surface of the Pt tube 702 has an effect on the oxygen level at the internal interface of the Pt tube 702 and glass 704. As soon as the current is applied across the coating of zirconia 706 to remove oxygen, a shift was seen in the partial pressure of oxygen on the internal surface of the Pt tube 702. There is a gradual continued downward trend in the partial pressure of oxygen on the internal surface of the Pt tube 702 due to the kinetics of oxygen removal from this interface. This reaction is reversed when the current is turned off. The internal surface of the Pt tube 702 begins to re-oxidize. This behavior is typical to what is seen when the dew point on the external surface of the Pt tube 702 is changed. Historic data for this is provided in the graph shown in FIG. 9.

Figure 9:
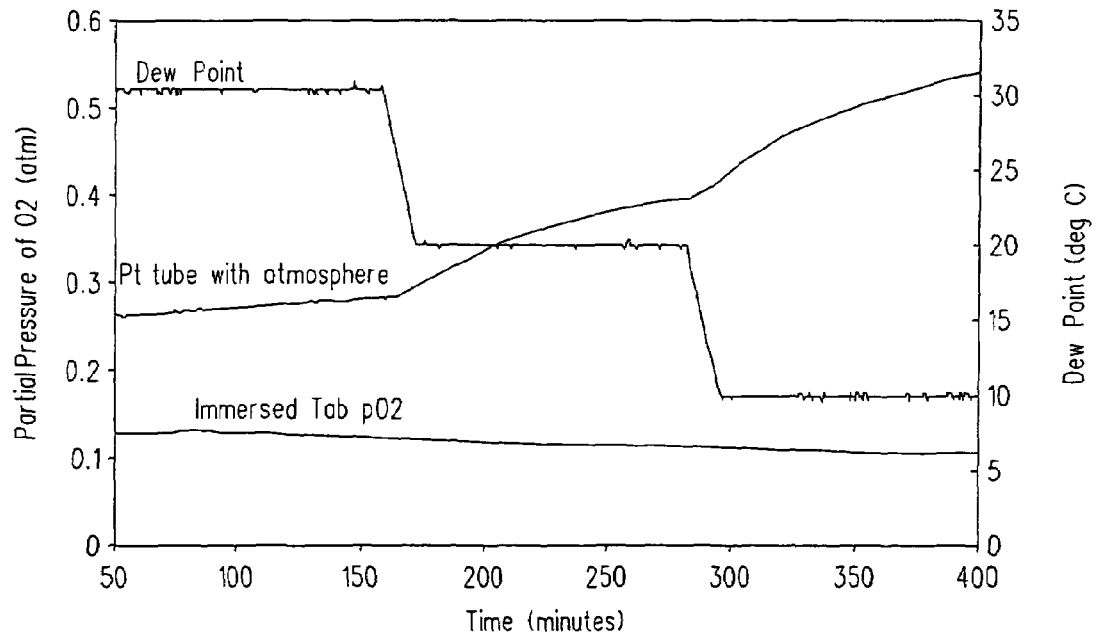
FIG. 9 is a graph that illustrates data which shows the impact of the dewpoint on the partial pressure of oxygen at the interface of the Pt tube and glass in the experimental set-up shown in FIG. 7.

Referring to the graph shown in FIG. 9, it is apparent that the dew point surrounding the Pt tube 702 was decreased in several steps. A decrease in dew point lowered the partial pressure of hydrogen on the outside of the Pt tube 702, leading to an increase in hydrogen permeation. This was seen as an increase in the partial pressure of oxygen at the internal interface of the Pt tube 702 and glass 704. Thus, the experimental results shown in FIGS. 8 and 9 show similar behaviors, a higher partial pressure of hydrogen at the external surface of the Pt tube 702 results in a lowering of the oxygen level at the interface of the Pt tube 702 and glass 704, because it was stopping hydrogen permeation. Whereas, a decrease in the partial pressure of hydrogen at the external surface of the Pt tube 702 results in an increase in the oxygen level at the interface of the Pt tube 702 and glass 704, because of the increase in hydrogen permeation. Moreover, the data clearly shows that the application of 2 amps of current to a 4 $in^2$ area of Pt caused more of a shift in the partial pressure of oxygen than a 60° F. shift in dew point. This indicates that the zirconia oxygen extraction system of the present invention is capable of a broader range of protection than the traditional humidity control enclosure disclosed in U.S. Pat. No. 5,758,726.

Following are some advantages and uses of the system 100 and 100' and method 200 of the present invention:

The present invention also reduces the oxidation of the external surfaces of the platinum containing components. Current technology relies on a coating, such as Rokide (aluminum oxide) on the outer surface of platinum containing components to limit the contact of air (oxygen) with the precious metal. This invention provides a means of lowering the oxygen level, which is a key driver in the oxidation reaction of platinum.

The present invention provides a means of controlling the partial pressure of oxygen around the external surface of the system, without the use of an enclosure or secondary vessel to control the atmosphere around the system.

The present invention is particularly useful for forming high melting or high strain point glass sheets like the ones used in flat panel displays.

The present invention provides an alternative to changing the batch constituents of the glass, such as, for example, the addition of arsenic-containing materials to the glass batch. In addition, the present invention provides an alternative to using low water containing batch constituents to make the glass.

The present invention could help anyone who melts, delivers or forms glass in a platinum-containing vessel. In addition, the present invention could be beneficial in the manufacturing of Vycor tubing and sheet. Moreover, the present invention could be beneficial in the manufacturing on non-LCD glass.

The present invention can be used in any glass or melting system in which glass comes in contact with refractory metals such as Pt, Mo, Rh and alloys. This contact could be in the melting, delivery or forming phase of production.

If there is a process instability or change in the water content of the glass that leads to an increase in hydrogen permeation blistering, then there is often no way to respond to this problem using the traditional humidity control enclosure since it may be operating at its maximum dewpoint. The present invention has a better chance of solving this problem.

Preferred oxygen ion transportable materials that can be used in the present invention are yttria stabilized zirconia or Ca stabilized zirconia. Other types of oxygen ion transportable materials can be used as well such as partially stabilized zirconias doped with yttria and Ca, and partially and fully stabilized zirconias doped with oxides of Sc, Nd, Sm, Eu, Gd, Tb, Dy, Ho, Er, Tm, Yb, Lu and Mg. $CeO2$, $TiO2$, $SnO2$, $YNbO4$, $YTaO4$, rare earth niobates/tantalates also can stabilize or partially stabilize the cubic and or tetragonal phases, but create fewer oxygen vacancies in the zirconia lattice reducing the ionic conductivity and are not as preferred. Mixtures of the above listed dopants can be used. Zirconias normally have hafnia levels of 1–10%. Hafnia and mixtures of hafnia and zirconia with dopants can be used, but cost more. Numerous other oxygen ion conductors such as doped lanthanum gallate have been discovered and can be used when their melting points, oxygen partial pressure stability regions, and low electronic conductivity regions are not exceeded. It should be appreciated that there are many ways to apply the oxygen ion transportable materials, one such way is to use plasma spraying. The coating of oxygen ion transportable materials need not be fully dense but should be somewhat impervious to oxygen gas ($O_2$).

It should also be appreciated that it is also possible to prevent hydrogen permeation and the subsequent blister generation by a method/system that allows a reduced oxygen atmosphere to be maintained or created around the external non-glass contact surface of the system 100 and 100' or even a traditional system. A potential means of achieving the reduced partial pressure of oxygen would be to enclose the external surface or a part of the surface of the system 100 and 100' in a container that has a low oxygen content gas flowing into it. This would form an atmosphere such that the formation of hydrogen gas from the breakdown of moisture in the atmosphere is favored. This could be used to improve a traditional system and could also be used in conjunction with the present invention to obtain a higher partial pressure of hydrogen even at very low dewpoint conditions.

The refractory metal component used in the vessels of the system 100 and 100' can include a metal selected from the group of platinum, molybdenum, palladium, rhodium and alloys thereof.

Although two embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method of forming a glass material utilizing an apparatus that includes at least one vessel containing a refractory metal component having an inner wall which contacts the glass, said method comprising the steps of:
    coating an outer wall of the refractory metal component with an oxygen ion transportable material;
    coating at least a portion of the oxygen ion transportable material with a conductive electrode; and
    applying a DC voltage to the refractory metal component and the conductive electrode.

2. The method of claim 1, wherein when said DC voltage is applied to the refractory metal component and the conductive electrode then oxygen ions migrate from the refractory metal component to the conductive electrode which enables one to control the partial pressure of oxygen around an exterior of the at least one vessel which effectively reduces hydrogen permeation from molten glass that effectively suppresses the formation of undesirable gaseous inclusions within the glass material.

3. The method of claim 2, wherein the ability to control the partial pressure of oxygen around an exterior of the at least one vessel also helps one to effectively reduce the oxidation of external, non-glass contact surfaces of the refractory metal component.

4. The method of claim 1, further comprising the step of adjusting the DC voltage to control the rate of the oxygen migration from the refractory metal component to the conductive electrode which enables one to control a magnitude of the partial pressure of oxygen to be within a range of about 1 to $10^{-10}$ atmospheres around the exterior of the at least one vessel.

5. The method of claim 1, wherein said at least one vessel includes a melting vessel, a fining vessel, a delivery vessel, a mixing vessel or a forming vessel.

6. The method of claim 1, wherein said refractory metal component includes a metal selected from the group of platinum, molybdenum, palladium, rhodium and alloys thereof.

7. The method of claim 1, wherein said oxygen ion transportable material includes partially or fully stabilized zirconia.

8. The method of claim 1, wherein said glass material is a glass sheet used in a liquid crystal display.

9. A system used to form a glass material, said system comprising:
    a vessel that includes a refractory metal component having an inner wall that contacts molten glass and an outer wall coated with an oxygen ion transportable material which is then coated with a conductive electrode; and
    a DC power source having a negative power lead connected to the refractory metal component and a positive power lead connected to the conductive electrode.

10. The system of claim 9, wherein when said DC power source supplies DC power across the oxygen ion transportable material then oxygen ions migrate from the refractory metal component to the conductive electrode and enables one to control the partial pressure of oxygen around an exterior of the vessel which helps one to effectively suppress the formation of undesirable gaseous inclusions and surface blisters within said glass material.

11. The system of claim 10, wherein said DC power source in addition to enabling one to control the partial pressure of oxygen around the exterior of the vessel also helps one to effectively reduce the oxidation of external, non-glass contact surfaces of the refractory metal component.

12. The system of claim 9, wherein said DC power source is capable of supplying adjustable DC power which enables one to control the rate of the oxygen migration from the refractory metal component to the conductive electrode which enables one to control a magnitude of the partial pressure of oxygen to be within a range of about 1 to $10^{-10}$ atmospheres around the exterior of the vessel.

13. The system of claim 9, wherein said vessel includes a melting vessel, a fining vessel, a delivery vessel, a mixing vessel or a forming vessel.

14. The system of claim 9, wherein said refractory metal component includes a metal selected from the group of platinum, molybdenum, palladium, rhodium and alloys thereof.

15. The system of claim 9, wherein said oxygen ion transportable material includes partially or frilly stabilized zirconia.

16. The system of claim 9, wherein said glass material is a glass sheet used in a liquid crystal display.

* * * * *